Nov. 10, 1936.   H. D. GEYER   2,060,566
ANTISQUEAK TRIM STRIP FOR AUTOMOBILE FENDERS
Filed Oct. 26, 1933

INVENTOR
Harvey D. Geyer
BY
Spencer Hardman & Fehr
HIS ATTORNEYS

Patented Nov. 10, 1936

2,060,566

UNITED STATES PATENT OFFICE 2,060,566

ANTISQUEAK TRIM STRIP FOR AUTOMOBILE FENDERS

Harvey D. Geyer, Dayton, Ohio, assignor, by mesne assignments, to General Motors Corporation, Detroit, Mich., a corporation of Delaware Application October 26, 1933, Serial No. 695,278

3 Claims. (Cl. 280—152)

This invention relates to anti-squeak gasket strips adapted to be clamped between two bodies, such as an automobile fender and its supporting body, and prevents squeaks at the joint.

An object of this invention is to provide a simple and efficient anti-squeak strip having two layers capable of sliding relative to each other over a long period of time without squeaking, the outer surfaces of the two layers being adapted to adhere respectively to the connected bodies between which the strip is clamped.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 2:
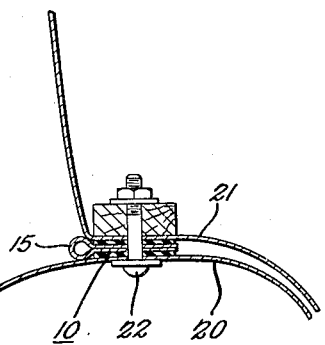
Fig. 2 is a section on line 2—2 of Fig. 1.
Figure 1:
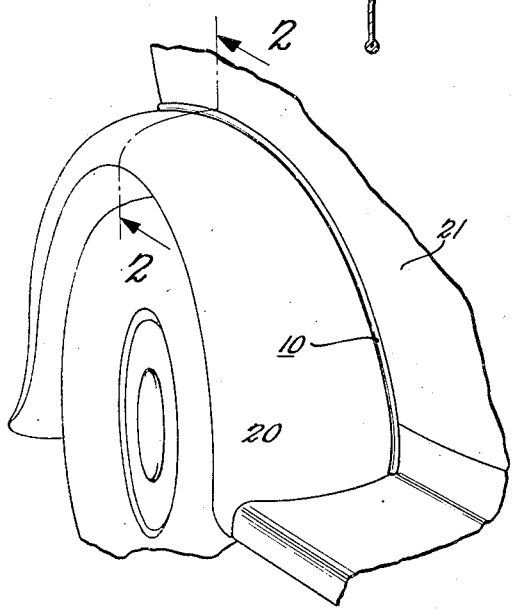
Fig. 1 is a perspective view showing the anti-squeak strip of this invention applied between an automobile rear fender and the adjacent body portion.

Numeral 10 designates the anti-squeak strip as a whole. Strip 10 is made by taking a long strip of fabric 12 of about double the width of the completed strip 10 and, while it is in the flat, calendering two strips 11 of uncured rubber thereupon on one surface thereof but leaving the longitudinal central portion of the fabric uncoated with rubber. On the opposite side of the fabric sheet 12 a coating 13 of a suitable hard dry solid anti-friction compound is applied. Preferably this anti-friction coating consists chiefly of high viscosity cellulose nitrate and very finely divided amorphous graphite mixed therein to form a homogeneous mixture, the weight of graphite being about four to six times the weight of the dry cellulose nitrate in the final compound. The fabric strip 12, having the rubber strips 11 on one side and the lubricant coating 13 on the other, is then compressed between two polished steel plates in a press for about five minutes at a pressure of about 750 lbs. per square inch, the press platens being heated to 290° F. This vulcanizes the rubber layers 11 and provides a hard smooth molded surface to the lubricant coating 13 and also causes both the rubber layers 11 and the coating 13 to penetrate into the fabric and gives a strong bond therebetween. The manufacture of composite anti-friction strips having a cellulose-nitrate graphite coating thereon is disclosed and claimed in my copending application S. N. 680,740, filed July 17, 1933.

Figure 3:
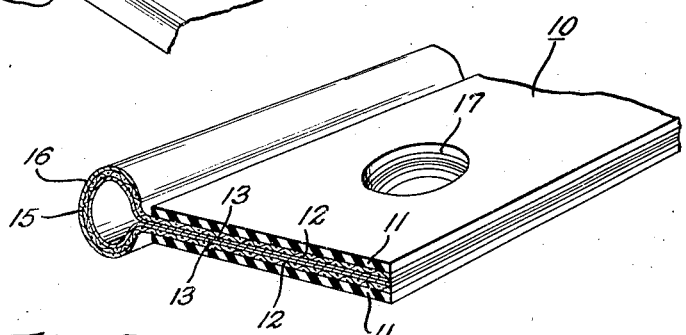
Fig. 3 is a perspective view of the strip on an enlarged scale to show its structure.

The fabric is then folded over upon itself and shaped so that the anti-friction coatings 13 contact and the soft rubber layers 11 will be exposed on the upper and lower surfaces, as shown in Fig. 3. Preferably a small hollow bead 15 is formed at the fold in the fabric 12. The outer exposed surface of bead 15 may be surface-finished by applying a suitable finish coating 16 thereupon, which finish coating is preferably identical with or similar to the cellulose nitrate and graphite compound used for the coating 13. Such a coating provides the desired stiffness to bead 15 and improves its weather resisting qualities. Suitably spaced holes 17 may be punched in the strip 10 for the attaching bolts or screws.

This strip 10 is clamped between the fender 20 and the body portion 21 by suitable screws or bolts 22, as clearly shown in Fig. 2. The strip 10 has sufficient flexibility to be easily bent to the curvature of the fender.

In operation, the soft rubber layers 11 will adhere to the surfaces 20 and 21 respectively, against which they are clamped, due to their high friction qualities while the contacting anti-friction layers 13 will slide easily upon one another without noise or squeaks. Hence whenever the fender 20 is forced by body distortion or from any cause to move relative to the support 21, all such movement will occur by relative sliding of the anti-friction surfaces 13 and thus squeaks are prevented. Many prior forms of non-metallic gaskets have been tried to eliminate squeaks between a fender and an automobile body but without complete success since sooner or later squeaks develop due to long-continued relative sliding between some surfaces. The anti-friction material of the coatings 13 of this invention has extremely long-lasting qualities and since these wear coatings are cushioned by the resilient rubber layers 11 high pressure at localized points is prevented and hence the life of these wear coatings 13 is greatly increased and will easily last the life of the automobile. These strips 10 also obviously perform the function of providing a neat-appearing waterproof joint. Such strips may be conveniently used between the chassis frame and the body sills, or at any joint where squeaking is liable to develop after a period of use of the automobile.

While the form of embodiment of the present invention as herein disclosed, constitutes a preferred form, it is to be understood that other forms might be adopted, all coming within the scope of the claims which follow.

What is claimed is as follows:

1. An anti-squeak strip for disposition between two abutting members having only slight relative movement, comprising: a fabric strip having a longitudinal fold therein forming a hollow bead and two laterally projecting contacting layers having a dry solid anti-friction coating on their mutually contacting surfaces whereby to facilitate relative sliding therebetween, said contacting layers having a relatively high friction coating on their outer surfaces which cause said layers to adhere to and move individually with the two abutting members respectively.

2. An anti-squeak strip for disposition between two abutting members having only slight relative movement, comprising: two contacting layers having a dry solid anti-friction coating on their mutually contacting surfaces whereby to facilitate relative sliding therebetween, said contacting layers having adhesive coatings on their opposed outer surfaces respectively which cause said layers to adhere to and move individually with the two abutting members respectively when in use.

3. An anti-squeak strip for disposition between two abutting members having only slight relative movement, comprising: two contacting layers having a dry solid anti-friction coating on their mutually contacting surfaces whereby to facilitate relative sliding therebetween, said contacting layers having resilient rubber coatings on their opposed outer surfaces which cause said layers to move individually with the two abutting members respectively.

HARVEY D. GEYER.